(12) United States Patent
Jernstrvm

(10) Patent No.: US 8,070,185 B2
(45) Date of Patent: Dec. 6, 2011

(54) RESTRAINT DEVICE FOR A SEAT BELT

(75) Inventor: Clas Jernstrvm, Askim (SE)

(73) Assignee: Volvo Car Corporation, Gothenburg (SE)

( * ) Notice: Subject to any disclaimer, the term of this patent is extended or adjusted under 35 U.S.C. 154(b) by 2086 days.

(21) Appl. No.: 10/798,758

(22) Filed: Mar. 11, 2004

(65) Prior Publication Data

US 2005/0242559 A1 Nov. 3, 2005

(30) Foreign Application Priority Data

Mar. 11, 2003 (EP) .................................. 03075706

(51) Int. Cl.
*B60R 22/28* (2006.01)
(52) U.S. Cl. .......................... 280/805; 280/806; 297/472
(58) Field of Classification Search .................. 280/805, 280/806; 297/470–472
See application file for complete search history.

(56) References Cited

U.S. PATENT DOCUMENTS

| 5,358,276 | A | * | 10/1994 | Lane, Jr. ........................ 280/806 |
| 5,531,479 | A | * | 7/1996 | Bauer ............................ 280/806 |
| 6,213,510 | B1 | * | 4/2001 | Suyama ........................ 280/805 |
| 6,299,092 | B1 | * | 10/2001 | Smithson et al. .......... 242/379.1 |
| 2011/0074142 | A1 | * | 3/2011 | Rydsmo et al. ................ 280/806 |

* cited by examiner

*Primary Examiner* — Eric Culbreth
(74) *Attorney, Agent, or Firm* — Brooks Kushman P.C.

(57) ABSTRACT

The invention relates to a restraint device (1) for a seat belt (2) in a vehicle, comprising a housing (10) for guiding the seat belt (2) and for accommodating an energy-absorbing element (12) adapted to cooperate with the seat belt (2) so as to absorb energy when a predetermined retardation condition of the vehicle is fulfilled. Said device (1) comprises a device (15, 16, 23, 27, 28) for attaching the energy-absorbing element (12) to said seat belt (2) when said condition is fulfilled, said energy-absorbing element (12) being adapted to be attached in a lamellar manner to said seat belt (2) along a predetermined length thereof. The invention also relates to a method for restraining a seat belt (2). By means of the invention, a cost effective and safe device and method for restraining a seat belt in the event of a vehicle collision is obtained.

19 Claims, 3 Drawing Sheets

RESTRAINT DEVICE FOR A SEAT BELT

TECHNICAL FIELD

The invention relates to a restraint device for a seat belt in a vehicle, comprising a housing for guiding said seat belt and for accommodating an energy-absorbing element adapted to cooperate with said seat belt so as to absorb energy when a predetermined retardation condition of the vehicle is fulfilled.

The invention also relates to a method for restraining a seat belt in a vehicle, comprising guiding said seat belt through a housing having an energy-absorbing element, and absorbing energy by means of said energy-absorbing element when a predetermined retardation condition of the vehicle is fulfilled.

BACKGROUND ART

In the field of motor vehicles, there has been a steady development of various types of interior fittings and equipment for the safety and comfort of the occupants of a vehicle.

Concerning seat belts, many types of seat belt arrangements have been developed. When a vehicle frontal collision occurs, a vehicle seat belt is effective to fasten and protect an occupant against injuries. A seat belt is normally wound around an axis in a seat belt retractor. There is, however, a part of the seat belt that will be paid out in the event of a collision due to the fact that the seat belt is normally not tightly wound around the seat belt retractor axis. This part of the seat belt results in a slack which will cause the occupant that is fastened by the seat belt to travel a small distance forwards with respect to the vehicle before the seat belt stops the forward motion of the occupant. This means that the occupant will attain a certain velocity with respect to the vehicle before being caught by the seat belt. This may cause injuries to the occupant.

In order to solve this problem, it is previously known to provide the seat belt with a pre-tensioner which winds back the seat belt retractor axis, thus tightening the seat belt, when a collision occurs. The pre-tensioner is connected to a suitable retardation sensor, and when the vehicle is subject to a retardation which exceeds a predetermined limit, a control signal will be fed to the pre-tensioner. Upon reception of the control signal, the pre-tensioner tightens the seat belt essentially before the fastened occupant has begun to move forwards, thus eliminating the small slack. Thus, the injury preventing function of the seat belt is enhanced. The pre-tensioner may operate to tighten the seat belt by means of a spring or by means of pyrotechnics. The retardation sensor may be the same that generates a control signal to activate one or more airbags installed in the vehicle.

Using the pre-tensioner described above, the fastened occupant is subject to an abrupt impact force in the event of a frontal collision. Therefore, it is previously known to use a seat belt which, in the event of a collision, permits the fastened occupant to travel forwards with respect to the vehicle in a controlled manner. In this manner, an even higher degree of safety is provided. The occupant is thus still retained, and is always restrained by the seat belt which has a retaining force but which also permits a forward decelerated motion.

The patent document U.S. Pat. No. 6,213,510 teaches an arrangement in which a seat belt runs through a restraint device which mechanically actuates an energy-absorbing device for clamping the seat belt and then stopping an occupant during a collision. The energy-absorbing device is constituted by a plastically deformable plastic strip, allowing the occupant to travel forwards in a controlled manner before being stopped completely.

A disadvantage with the arrangement according to U.S. Pat. No. 6,213,510 is that it relies on an energy-absorbing element in the form of a compressible strip. Due to the fact that the belt pay-out for a front seat occupant, for example, should be as much as 45 cm in order to provide adequate protection, the housing which accommodates the strip must be of equal length. This is a problem since it requires a relatively large space in a vehicle.

SUMMARY OF THE INVENTION

It is an object of the present invention to provide an improved restraint device for providing a controlled retardation of an occupant in a vehicle in the event of a collision or similar situation.

The above-mentioned object is accomplished by means of a device as initially mentioned, which comprises means for attaching the energy-absorbing element to said seat belt when said condition is fulfilled, said energy-absorbing element being adapted to be attached in a lamellar manner to said seat belt along a predetermined length thereof.

The invention constitutes a restraint device for a seat belt in a vehicle which comprises a housing for guiding the seat belt and which also supports an energy-absorbing element. The energy-absorbing element is arranged to cooperate with the seat belt during a collision, thereby absorbing energy. According to the invention, means is provided for attaching the energy-absorbing element to the seat belt when a collision occurs. In particular, the energy-absorbing element is attached in a lamellar manner to the seat belt, along a certain length of the seat belt. The energy-absorbing element is preferably in the form of an elongate and thin strip of a suitable material, for example a suitable plastic material. Alternatively, the energy-absorbing element can be made from another material, for example metal. Furthermore, the energy-absorbing element is initially wound upon an axis and unwound when a collision occurs and it is attached to the seat belt. As an alternative to being wound on an axis, the energy-absorbing element can be initially stored in a bent or zigzag manner in said housing. Also, the energy-absorbing element can be adapted so as to cooperate with the energy-absorbing properties of an airbag, if such airbag is mounted in the vehicle in question.

By means of the invention, certain advantages are obtained. Firstly, it can be noted that it constitutes a compact solution which requires very little space in a vehicle. Furthermore, according to a preferred embodiment, the energy-absorbing element is constituted by a spirally wound ribbon, which offers a relatively long retardation path in comparison with its relatively small size. Further, its activation mechanism offers a very controlled course of events which gives a firm and quick locking. Also, its relatively simple working mechanism offers a reliable function.

BRIEF DESCRIPTION OF DRAWINGS

In the following text, the invention will be described in detail with reference to the attached drawings. These drawings are used for illustration only and do not in any way limit the scope of the invention. In the drawings.

PREFERRED EMBODIMENTS

Figure 1:
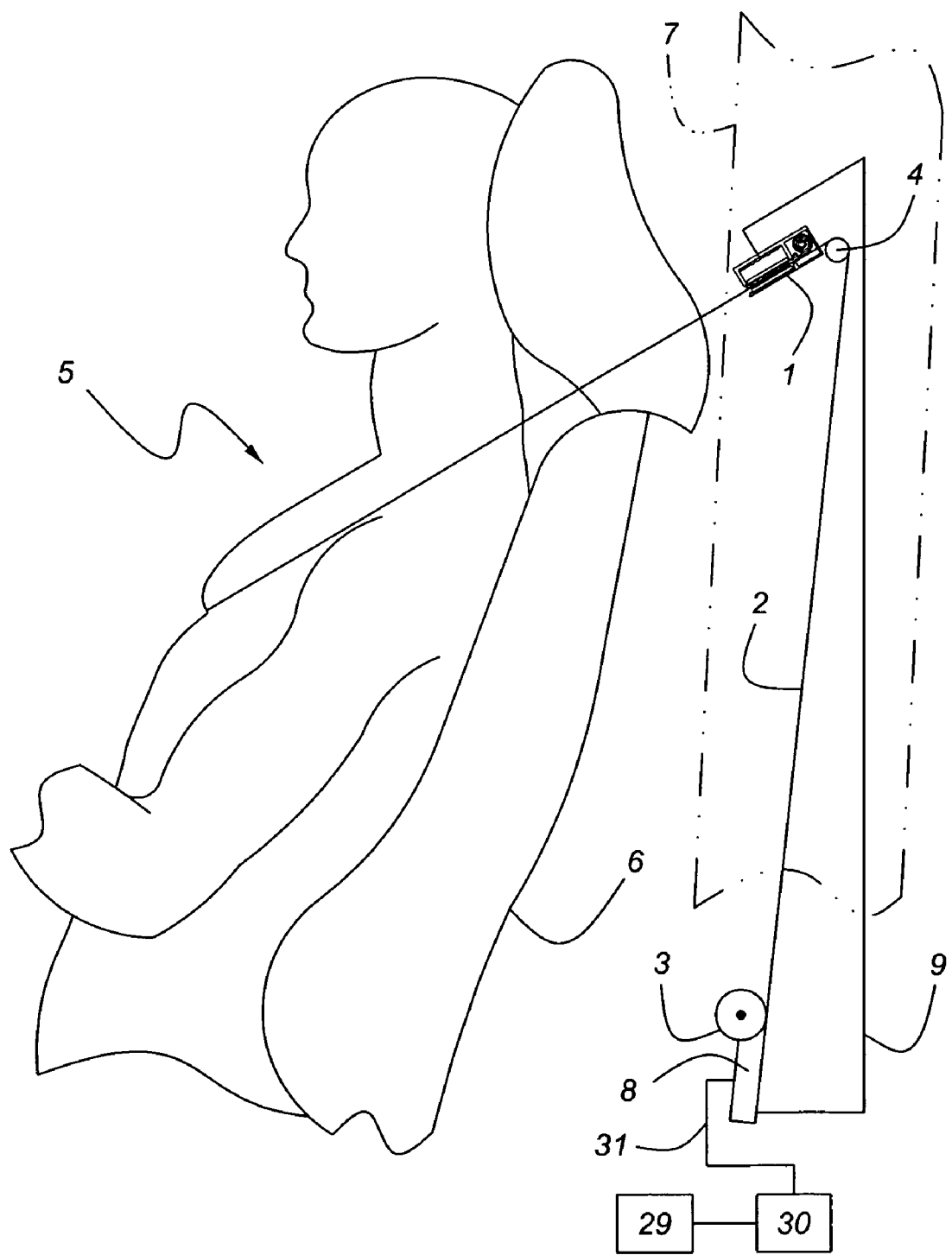
FIG. 1 shows a side view of an occupant in a vehicle that is restrained by a seat belt equipped with the device according to the invention.

In the following text, an embodiment of the present invention will be described in detail. With reference to FIG. 1, a restraint device 1 for a seat belt 2 in a vehicle will be described. The restraint device 1 is of a seat belt grabbing kind, which is arranged so as to reduce the pay-out of the seat belt 2 and to restrain a forward motion of an occupant in the event of a collision, as will be described below.

As shown in FIG. 1, the seat belt 2 runs from a seat belt retractor 3 placed at the lower part of the vehicle through an upper belt guide 4 near the shoulder of a fastened occupant 5 that is seated in a vehicle seat 6. The seat belt retractor 3 and the upper belt guide 4 are suitably positioned close to the so-called B-pillar 7 of the vehicle. Furthermore, the seat belt 2 extends through said restraint device 1 which is placed close to the upper belt guide 4, and further across the chest of the fastened person 5. The seat belt 2 is locked in a seat belt locking device (not shown) as is previously known in conventional 3-point seat belts as commonly used in cars. The seat belt retractor 3 is also of a commonly known type, i.e. it consists of a spring-biased axis (not shown) which is connected to an end of the seat belt 2. The spring force of the retractor 3 is directed in such a way that the axis wounds in the seat belt 2 onto itself. When the seat belt 2 is subject to a force that overcomes the spring force, the seat belt 2 is unwound from the axis.

Furthermore, the seat belt retractor 3 is equipped with a seat belt pre-tensioner 8 of a type previously known. During a collision, the pre-tensioner 8 is arranged to tighten the seat belt 2 in a much more tight fashion than when in ordinary use, thus preventing a slack in the seat belt 2 should a collision occur. Preferably, as will be described below, the actuation of the restraint device 1 is controlled by the operation of the pre-tensioner. For this reason, the pre-tensioner 8 is connected with the restraint device 1 via a first electrical connection 9.

Figure 2:
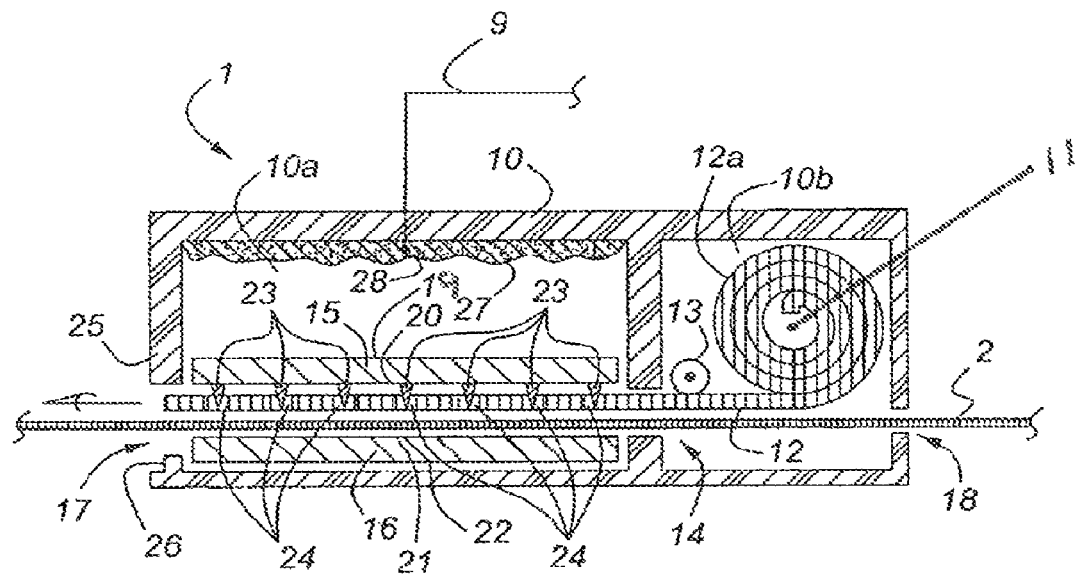
FIG. 2 shows a longitudinal cross-section of the device according to the invention in a first state.

With reference to FIG. 2, a longitudinal cross-section view of the restraint device 1 is shown. The restraint device 1 consists of a housing 10 which is arranged so as to support an axis 11 around which an energy-absorbing element 12 is wound. In a preferred embodiment, the energy-absorbing element 12 consists of an elongated ribbon or strip made of a plastic material. The axis 11 is arranged so as to extend generally perpendicular to the seat belt 2. The ribbon 12 is guided, by means of a guiding wheel 13, through a first slot 14 in the housing 10 and then between a first plate 15 and a second plate 16, before it emerges through a second slot 17 on an opposite side of the housing 10. As shown in FIG. 2, the first plate 15 and the second plate 16 are arranged so as to extend generally parallel to the seat belt 2.

In a first inactive state as shown in FIG. 2, the ribbon 12 is partially unwound from the axis 11, having an unwound free end part that ends about in line with the second slot 17. The seat belt 2 runs through a third slot 18 in the housing 10, past a wound part 12a (i.e. a part 12a which is wound on the axis 11) of the ribbon 12, and furthermore essentially parallel to the unwound free end part of the ribbon 12. The seat belt 2 extends through the first slot 14 and then through the second slot 17 in the direction as indicated with an arrow in FIG. 2. All three slots 14, 17, 18 are essentially aligned so that the seat belt 2 is guided through the housing 1 in a manner so that it extends generally parallel to the ribbon 12.

According to the embodiment shown, the housing 10 is formed with a first chamber 10a and a second chamber 10b. The first chamber 10a accommodates the first plate 15 and the second plate 16, whereas the second chamber 10b accommodates the axis 11, the guiding wheel 13 and the wound part 12a of the ribbon 12. The seat belt 2 extends through the first chamber 10a and the second chamber 10b, between the first plate 15 and the second plate 16. To this end, the first chamber 10a and the second chamber 10b are connected by means of the first slot 14. As described above, the free end of the ribbon 12 extends generally parallel to the seat belt 2.

The first plate 15 has a first main surface 19 and a second main surface 20 and the second plate 16 has a first main surface 21 and a second main surface 22. The main surfaces 19, 20, 21, 22 extend essentially parallel to each other and also essentially parallel to the seat belt 2 and the free end part of the ribbon 12. The second main surface 20 of the first plate 15 faces the free end part of the ribbon 12, the seat belt 2 and then the first surface 21 of the second plate 16, in this order. The second main surface 20 of the first plate 15 is equipped with a predetermined number of engaging nails 23 with sharp tips protruding essentially perpendicular from the main surface 20. Each one of these nails 23 is designed to penetrate a corresponding pre-made hole 24 in the ribbon 12. Thus, the tips of the nails 23 protrude in a manner so that they are generally flush with the surface-plane of the ribbon 12 which is closest to the belt 2. Furthermore, the nails 23 extend towards the seat belt 2 and the first surface 21 of the second plate 16 without engaging any one of them in this first state.

The first slot 14, second slot 17 and third slot 18 are apertures which extend essentially perpendicular to the main surfaces 19, 20, 21, 22 of the first 15 and second plate 16. The first plate 15 is prevented from leaving the housing 10 by means of a front wall section 25 of the housing 10, as the first plate 15 is positioned in such a way that a part of it extends slightly above the second slot 17, using the orientation shown in FIG. 2. The second plate 16 is placed in front of the second slot 14, but is prevented from falling out from the housing 10 by means of a shear plug 26. The shear plug 26 will yield when it is subject to a force which is higher than a predetermined limit value.

Furthermore, the first chamber 10a accommodates an actuating device which is preferably in the form of an explosive charge 27 and an ignition device 28. The ignition device 28 is connected to the pre-tensioner 8 by means of the first electrical connection 9, as shown in FIG. 1.

Figure 3:
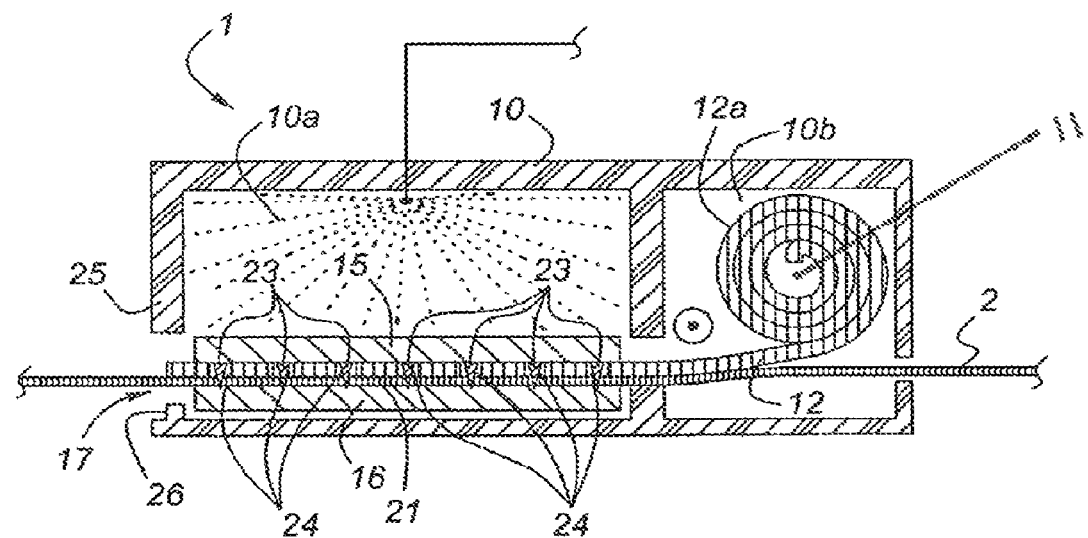
FIG. 3 shows a longitudinal cross-section of the device according to the invention in a second state.

With renewed reference to FIG. 1, a retardation sensor device 29 is arranged in the vehicle for continuously detecting its retardation. A value representing the detected retardation is continuously detected by means of a control unit 30. The control unit 30 compares the detected retardation value with a predetermined retardation value and when the detected retardation value exceeds a predetermined retardation limit value, it is assumed that a collision has occurred. Then, a control signal is sent from the control unit 30 to the pre-tensioner 8 in the seat belt retractor 3 via a second electrical connection 31. As a result, the pre-tensioner 8 is activated for tightening the seat belt 2. With reference to FIG. 2, when the seat belt 2 has been pre-tensioned a predetermined distance, a position sensor (not shown) in the seat belt retractor 3, which detector detects the length that the seat belt 2 is pre-tensioned, sends a control signal via the first electrical connection 9 to the ignition device 28 in the restraint device 1. The explosive charge 27 is thus detonated. As a consequence, and with reference to FIG. 3, the first plate 15 moves rapidly towards the seat belt 2, where the engaging nails 23 of the first plate 15 move through the pre-fabricated holes 24 in the ribbon 12 and penetrate the seat belt 2, and then penetrate the first surface 21 of the second plate 16. In this manner, a lamellar or sandwich-like structure is formed of the ribbon 12 and a section of the seat belt 2 on which the ribbon 12 is attached. The second plate 16 is made in such a material that the nails 23 get stuck in it when subject to the force of the explosive charge detonation caused by the explosive charge 27. When this happens, the seat belt 2 is fastened to the ribbon 12 in said lamellar or sandwich-like manner.

Figure 4:
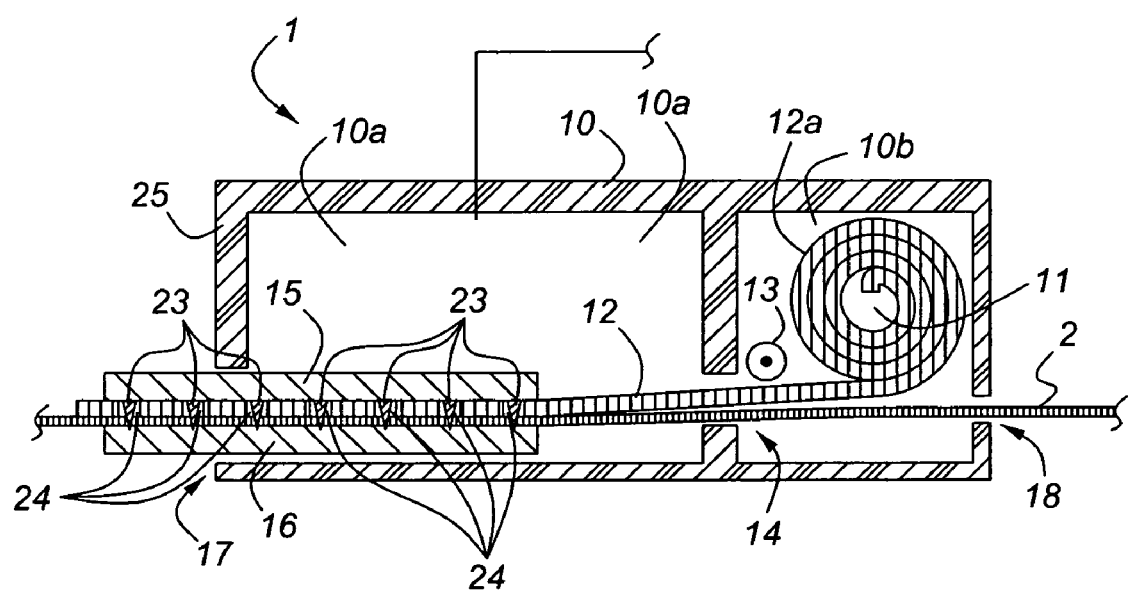
FIG. 4 shows a longitudinal cross-section of the device according to the invention in a third state.

When the first plate 15 has been pressed down, with its nails 23 pervading through the pre-fabricated holes 24 in the ribbon 12, through the seat belt 2 and into the first surface 21 of the second plate 16, it is now completely facing the second slot 17, and is not restrained by the wall part 25 of the housing 10 any more. The laminated package comprising the first plate 15, the ribbon 12, the seat belt 2 and the second plate 16 is thus prevented from leaving the housing 10 only by the shear plug 26. At this stage, the occupant 5 starts to move forwards relative to the vehicle compartment due to the inertia of the occupant's body during the retardation of the vehicle. The seat belt 2 is thus subject to a force due to the forward motion of the occupant. This force tends to pull the seat belt 2 forwards, and when this force exceeds a predetermined limit value, the shear plug 26 is broken by the second plate 16. With reference to FIG. 4, when the shear plug 26 yields, the two plates 15, 16 will move out of the housing 10, through the second slot 17, forced by the seat belt 2 which is fed into the third 18 and first 14 slot, due to the forward motion of the occupant due to the collision. As the nails 23 also penetrate the holes 24 in the ribbon 12 when the clamped plates 15, 16 leave the housing 10, not only the plates 15, 16, but also the ribbon 12 is forced out from the restraint device 1.

When the ribbon 12 is forced out together with the plates 15, 16 by the seat belt 2, the ribbon 12 is gradually unwound from the axis 11. As the ribbon 12 has a predetermined resistance to bending, it presents a resisting force to the forward pulling force due to the forward motion of the occupant. This resisting force is thus dependent on the width and thickness of the ribbon 12, and also of the properties of the plastic material that the ribbon 12 is made of. The ribbon 12 thus acts essentially like a spiral spring.

Consequently, according to the above described embodiment of the invention, the ribbon 12 can be forced to be attached in a lamellar manner to the seat belt 2 along a predetermined length of the seat belt 2. This length is determined by the dimensions of the first plate 15 and the second plate 16, and the positioning of the nails 23 (and holes 24). Preferably, the restraint device 1 is activated when the seat belt 2 has first been pre-tensioned, i.e. tightened, a certain amount. This can be determined by means of the above-mentioned position sensor. This means that the seat belt 2 first is pre-tensioned and then released in an energy-absorbing manner. In this way the occupant is restrained in a favourable and protective way during a collision or similar situation.

According to an alternative embodiment, the ribbon 12 can be made with two or more different widths and/or thicknesses in order to provide a corresponding number of steps for the resisting force of the restraint device. In this manner, a force limiter operating in two or more steps can be provided. According to a further alternative, a wedge-shaped plastic ribbon 12 can be used. In this manner, a continuous magnitude increase of the resisting force can be obtained. As the ribbon is shown in a side view in FIGS. 2-4, the width of the ribbon 12 is not indicated.

In another preferred embodiment, the ribbon 12 may be made in another material than plastic, for example a suitable metal.

The energy-absorbing operation of the invention can be coordinated with an airbag of conventional type, if such an airbag exists in the vehicle in question. For example, if an airbag is mounted before the occupant 5 shown in FIG. 1, the energy-absorbing element 12 can be manufactured with certain energy-absorbing properties, and if an airbag is not mounted before the occupant 5, the energy-absorbing element 12 may be given other energy-absorbing properties.

It is conceivable that the energy-absorbing element 12, as an alternative to the embodiment disclosed above in the form of a ribbon, may be constituted in other ways, for example film materials and discrete wires of suitable width for being penetrated by the nails 23.

Furthermore, the number of nails 23 and corresponding holes 24 in the energy-absorbing element 12 may vary. Although only shown as a single line of nails 23 and holes 24, they also preferably extend in the plane perpendicular to the plane of the paper.

The invention is not limited to the embodiment described, but can be modified within the scope of the appended claims. The seat belt restraint device 1 may for example be placed close to the floor of the vehicle, preferably close to the seat belt retractor 3. The restraint device 1 may even be integrated with the seat belt retractor 3, sharing the same housing.

The spiral winding of the energy-absorbing element 12 disclosed above is only one way to achieve such an energy-absorbing element 12 in a small space. The energy-absorbing element 12 may for example constitute of a plastic ribbon bent many times in a zigzag pattern, which zigzags unfold when the ribbon is pulled out of the housing 10 of the restraint device 1.

Finally, the present invention is not limited to use in vehicles such as private cars, but is also suitable for other types of vehicles, such as trucks and buses, and also aeroplanes.

The invention claimed is:

1. Restraint device for a seat belt in a vehicle, comprising a housing for guiding said seat belt and for accommodating an energy-absorbing element adapted to cooperate with said seat belt so as to absorb energy when a predetermined retardation condition of the vehicle is fulfilled, wherein said device comprises means for attaching the energy-absorbing element to said seat belt when said condition is fulfilled, said energy-absorbing element being adapted to be attached in a lamellar manner to said seat belt along a predetermined length thereof wherein the energy-absorbing element comprises an elongated ribbon being partly wound around an axis which is supported in said housing.

2. Restraint device according to claim 1, wherein said axis is arranged generally perpendicular to the longitudinal direction of the seat belt.

3. Restraint device according to claim 1, wherein the ribbon is adapted to unwind in a direction that is common with the motion of the seat belt when said condition is fulfilled, and where part of said ribbon being wound about said axis exercises a force counteracting said motion.

4. Restraint device according to claim 1 wherein the ribbon is made of a plastic material.

5. Restraint device according to claim 1 wherein the ribbon is made of a metal material.

6. Restraint device according to claim 1 wherein the means for attaching the energy-absorbing element to said seat belt comprises a first plate and a second plate, with the energy-absorbing element and the seat belt being guided between them, and an actuating device for bringing said plates together in the event of said condition being fulfilled.

7. Restraint device according to claim 6, wherein said actuating device comprises an explosive charge and an ignition device for igniting said explosive charge in the event of said condition.

8. Restraint device according to claim 6 wherein the first plate is equipped with a predetermined number of nails directed towards the second plate, which nails are adapted to penetrate the energy-absorbing element, the seat belt and to be fastened in the second plate during said bringing together of said plates.

9. Restraint device according to claim 6 wherein the actuating device is arranged so as to be activated depending on the operation of a seat belt pre-tensioner in said vehicle.

10. Restraint device according to claim 1 wherein said housing comprises a first chamber for accommodating said means for attaching the energy-absorbing element to said seat belt, and a second chamber for accommodating a part of said energy-absorbing element, said first chamber and second chamber being connected by means of a slot through which said energy-absorbing element and said seat belt extend.

11. Restraint device for a seat belt in a vehicle, comprising a housing for guiding said seat belt and for accommodating an energy-absorbing element adapted to cooperate with said seat belt so as to absorb energy when a predetermined retardation condition of the vehicle is fulfilled, wherein said device attaches to the energy-absorbing element to said seat belt when said condition is fulfilled, said energy-absorbing element being adapted to be attached to said seat belt along a predetermined length thereof, wherein the energy-absorbing element comprises an elongated ribbon being partly wound around an axis which is supported in said housing.

12. Restraint device according to claim 11, wherein said axis is arranged generally perpendicular to the longitudinal direction of the seat belt.

13. Restraint device according to claim 11, wherein the ribbon is adapted to unwind in a direction that is common with the motion of the seat belt when said condition is fulfilled, and where part of said ribbon being wound about said axis exercises a force counteracting said motion.

14. Restraint device according to claim 11 wherein the ribbon is made of a plastic material.

15. Restraint device according to claim 11 wherein the ribbon is made of a metal material.

16. Restraint device according to claim 11 wherein the energy-absorbing element attaches to said seat belt with a first plate and a second plate, with the energy-absorbing element and the seat belt being guided between them, and an actuating device for bringing said plates together in the event of said condition being fulfilled.

17. Restraint device according to claim 16, wherein said actuating device comprises an explosive charge and an ignition device for igniting said explosive charge in the event of said condition.

18. Restraint device according to claim 16 wherein the first plate is equipped with a predetermined number of nails directed towards the second plate, which nails are adapted to penetrate the energy-absorbing element, the seat belt and to be fastened in the second plate during said bringing together of said plates.

19. Restraint device for a seat belt in a vehicle, comprising a housing for guiding said seat belt and for accommodating an energy-absorbing element adapted to cooperate with said seat belt so as to absorb energy when a predetermined retardation condition of the vehicle is fulfilled, wherein said device attaches to the energy-absorbing element to said seat belt when said condition is fulfilled, said energy-absorbing element being adapted to be attached to said seat belt along a predetermined length thereof, wherein the energy-absorbing element comprises an elongated ribbon being partly wound around an axis which is supported in said housing, wherein the energy-absorbing element attaches to said seat belt with a first plate and a second plate, with the energy-absorbing element and the seat belt being guided between them, and an actuating device for bringing said plates together in the event of said condition being fulfilled, wherein the actuating device is arranged so as to be activated with activation of a seat belt pre-tensioner in said vehicle.

\* \* \* \* \*